United States Patent [19]

McCoy et al.

[11] Patent Number: 4,895,121

[45] Date of Patent: Jan. 23, 1990

[54] METHOD AND APPARATUS FOR MEASURING DETONATION IN AN INTERNAL COMBUSTION ENGINE

[75] Inventors: Steven R. McCoy, Washington; Thomas T. Stevenson, Dunlap; Douglas E. Carr, Chillicothe; Kevin D. King, Peoria, all of Ill.

[73] Assignee: Caterpillar Inc., Peoria, Ill.

[21] Appl. No.: 245,186

[22] Filed: Sep. 16, 1988

[51] Int. Cl.⁴ .............................................. F02P 5/14
[52] U.S. Cl. ......................................... 123/425; 73/35
[58] Field of Search .................... 123/425, 435; 73/35, 73/116, 117.3, 119 R

[56] References Cited

U.S. PATENT DOCUMENTS

| | | | |
|---|---|---|---|
| 3,822,583 | 7/1974 | Keller et al. | 73/35 |
| 4,002,155 | 1/1977 | Harned et al. | 123/425 |
| 4,012,942 | 3/1977 | Harned | 123/425 |
| 4,133,475 | 1/1979 | Harned et al. | 123/425 |
| 4,271,469 | 6/1981 | Kawai et al. | 73/117.3 |
| 4,300,503 | 11/1981 | Deleris et al. | 123/425 |
| 4,337,642 | 7/1982 | Yoshida | 123/425 |
| 4,364,260 | 12/1982 | Chen et al. | 73/35 |
| 4,384,473 | 5/1983 | Brandt | 73/35 |
| 4,418,567 | 12/1983 | Böning et al. | 73/35 |
| 4,424,706 | 1/1984 | Ola | 73/35 |
| 4,428,344 | 1/1984 | Focht | 123/425 |
| 4,444,042 | 4/1984 | Bonitz et al. | 73/35 |
| 4,466,405 | 8/1984 | Hattori et al. | 123/425 X |
| 4,512,309 | 4/1985 | Tansuwan | 123/425 |
| 4,558,674 | 12/1985 | Okado et al. | 123/425 |
| 4,606,315 | 8/1986 | Tobinaga et al. | 123/198 DC |
| 4,711,212 | 12/1987 | Haraguchi et al. | 123/425 |
| 4,774,922 | 10/1988 | Morita | 123/425 |

Primary Examiner—Willis R. Wolfe
Attorney, Agent, or Firm—Robert E. Muir

[57] ABSTRACT

A method and apparatus is provided for measuring detonation in an internal combustion engine. Vibration sensors located on the engine send signals through a filter which is turned to the cavity resonance of the engine's cylinders. The peaks and valleys of the filtered signals are detected and ratiometrically compared one with another to determine the magnitude of detonation. The detonation information may be used by an engine control to retard timing in response to a predetemined level of detonation.

25 Claims, 5 Drawing Sheets

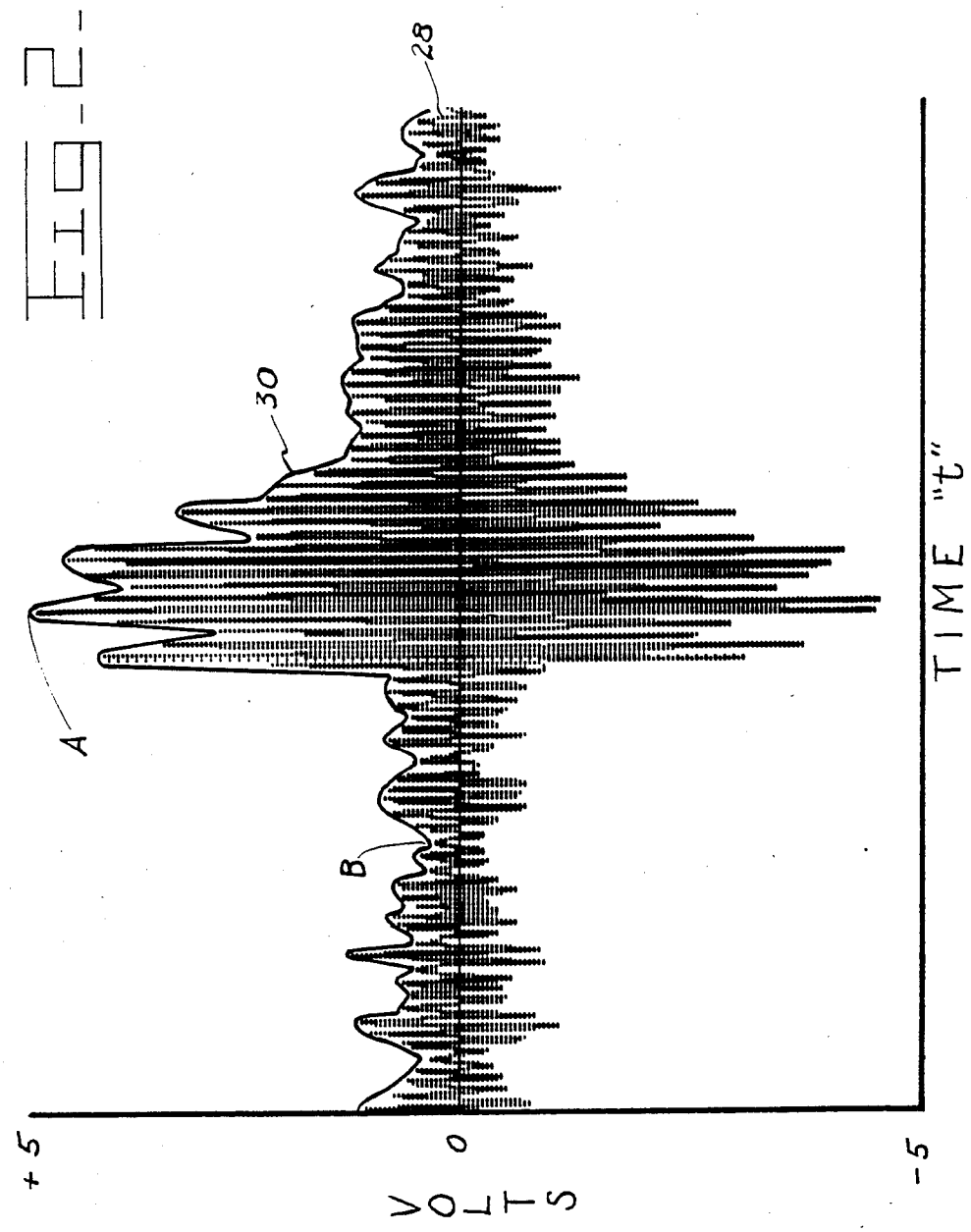

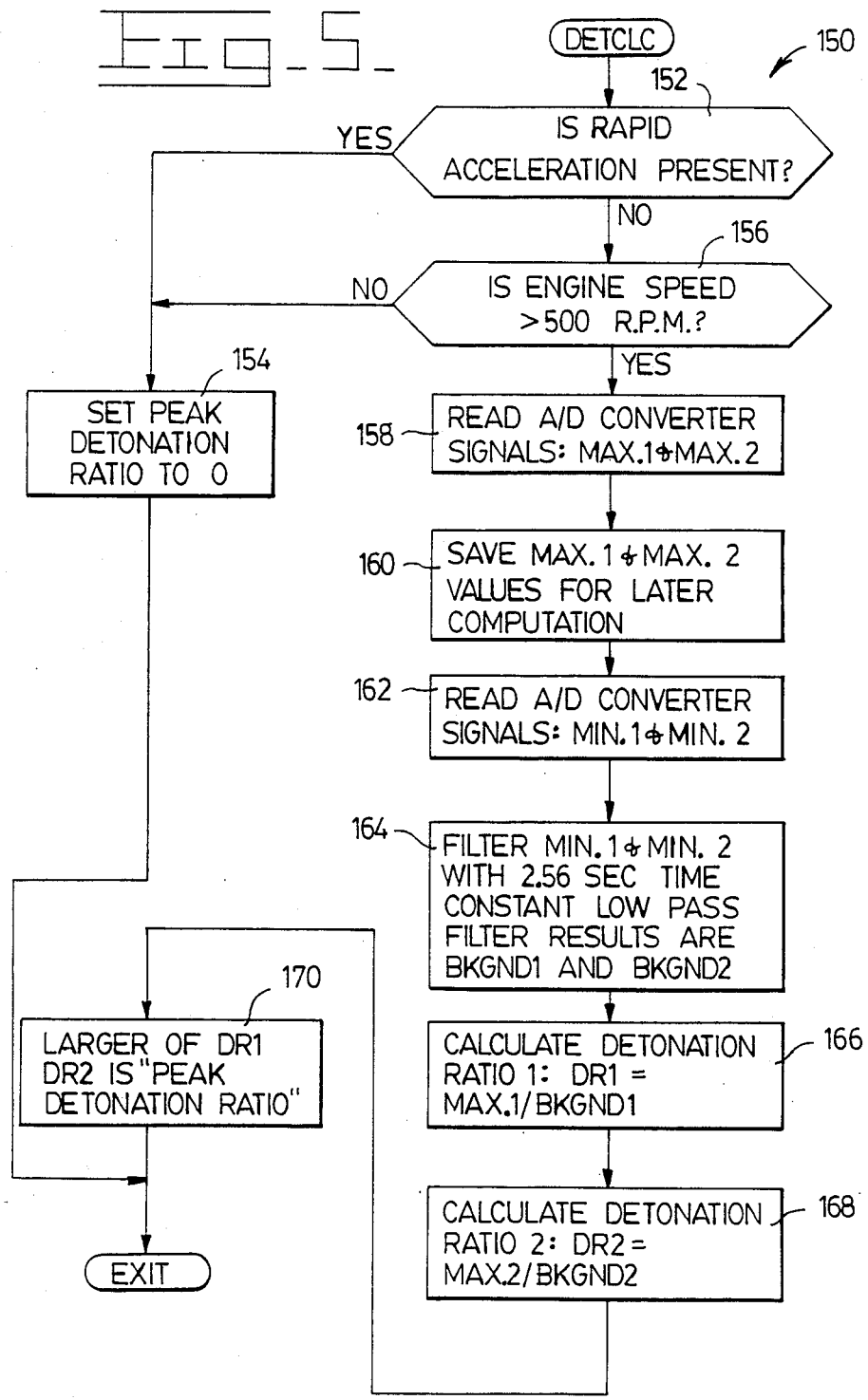

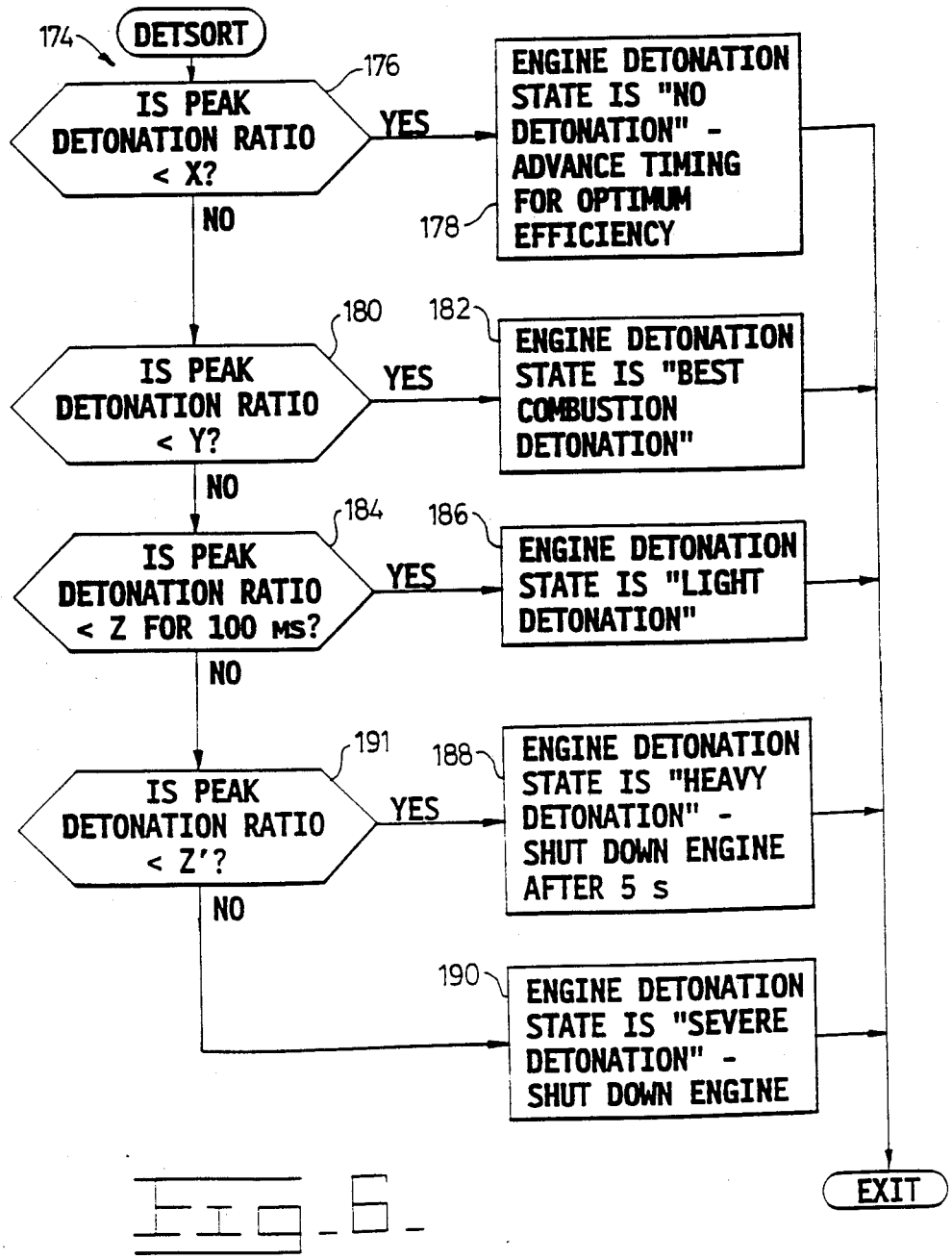
Fig_6.

METHOD AND APPARATUS FOR MEASURING DETONATION IN AN INTERNAL COMBUSTION ENGINE

TECHNICAL FIELD

This invention relates generally to the measuring of knock in an internal combustion engine and more particularly to a method of measuring knock in an internal combustion engine.

BACKGROUND ART

Explosive-detonation and autoignition of end gas in a combustion chamber produce a metallic sound, commonly referred to as knock. Knock is caused by improper ignition of fuel in an internal combustion engine. Improper ignition results in decreased engine performance and increased emissions. Knock, furthermore, generates acoustic vibrations which propagate throughout the engine structure, and possibly other adjoining structures. These vibrations, coupled with a rapid rate of pressure rise in the combustion chamber, may promote accelerated wearing of engine components. Wear may be even faster for engines operating with natural gas, due to a higher rate of pressure rise in the combustion chamber as compared with gasoline powered engines.

Detonation in an engine may be sensed by either a pressure sensor or a vibration sensor. Pressure sensing will provide only a knock signal; however, it is very costly where pressures are high, as in a diesel engine. Vibration sensing to measure the magnitude of detonation in an engine is difficult. Noise and vibrations unrelated to knock contaminate vibration sensor signals. Contaminated signals require complex filtering in order to detect signal components related to detonation. Alternatively, expensive sensors that may provide cleaner signals requiring less complex filtering. However sensor outputs fluctuate, thus inhibiting precise measurement of knock. For example, even supposedly identical accelerometers often vary due to manufacturing techniques, and as operating conditions change, the accelerometers deliver inaccurate signals.

Prior systems provide means for detecting knock and controlling selected engine operating parameters to reduce the knock to an acceptable level. Recently these efforts have been directed to sensing knock induced vibrations by monitoring one or more characteristic frequencies corresponding to the acoustic cavity resonance modes of the combustion chamber. These characteristic frequencies generally act as carrier waves and are amplitude modulated by the knock level vibrations. When demodulated, the magnitude of the envelope of the carrier wave denotes the magnitude of the knock. Discovering and monitoring cavity resonance frequencies reduces the amount of filtering needed to obtain acceptable detonation information. This information is typically used to reduce knock by retarding the spark advance. For example, U.S. Pat. No. #4,364,260 issued to Chen et al. on Dec. 21, 1982 discloses a knock detecting apparatus having an accelerometer tuned to the acoustic cavity resonance frequencies of the engine cylinders.

Air/fuel ratio controls and spark retarders attempt to reduce knock to acceptable levels, but these controls and their sensors can malfunction. Known oxygen sensors, in particular, have relatively short lives of 1000 to 2000 hours. In automotive applications this life expectancy is acceptable. However, work engines may be required to perform in excess of 10,000 hours. Should a sensor or control fail, the engine would be susceptible to possibly damaging knock. Furthermore, retarding has limits, since the engine will not operate if timing is severely retarded.

The present invention is directed to overcoming one or more of the problems as set forth above.

DISCLOSURE OF THE INVENTION

In one aspect of the invention a method is provided for measuring the magnitude of knock in an internal combustion engine having at least one combustion chamber. A signal responsive to vibrations of an engine is transmitted and then is filtered in a frequency band about a cavity resonance frequency of a combustion chamber of the engine. The filtered signal is demodulated to produce an envelope of the filtered signal. The maximum and minimum of the envelope is detected, and a ratio of each maximum to each respective minimum is determined. The ratio is correlative to the magnitude of knock in the engine.

In another aspect of the present invention an apparatus measures the magnitude of knock in an internal combustion engine having a plurality of combustion chambers. An accelerometer is mounted on a bank of the combustion chambers and arranged to deliver an electrical signal responsive to vibrations of the engine. A filter is tuned to pass frequencies of the received electrical signal in a band about a cavity resonance frequency of the combustion chambers. A demodulator detects the envelope of the filtered electrical signal. Means is provided for detecting the maximum and minimum magnitudes of each envelope. A means determines the ratio of each maximum to each respective minimum, the ratio being correlative to the magnitude of knock in the engine.

Determination of engine knock is important in the field of electronic engine controls. An engine operates at peak efficiency with a small amount of detonation. Therefore accurately detecting and measuring the magnitude of engine knock directly affects the efficiency of an engine control. As explained in the "Background" section, acoustic cavity resonance frequencies of combustion chambers in an engine carry knock signals. If these frequencies are isolated, through filtering, knock can be detected. However accurate measurement of engine knock, does not necessarily follow accurate detection. Since vibration sensors vary, even among supposedly "identical" sensors, accurate measurement remains a problem.

To minimize the effects the vibration sensors have on overall accuracy, the maximum relative output of each sensor is divided by the minimum relative output. Each time detonation occurs it produces a oscillatory vibration, so each detected detonation has a maximum and a minimum value. By taking a ratio of the maximum to the minimum, the effects of sensor drifting are negated. The resulting ratio is correlative to the magnitude of the detonation, and can be used in an engine timing control.

BRIEF DESCRIPTION OF THE DRAWINGS

FIG. 2 diagrammatically illustrates a knock signal;

FIG. 5 is a flowchart depicting a portion of software of the preferred embodiment; and FIG. 6 is a flowchart depicting another portion of software of the preferred embodiment.

BEST MODE FOR CARRYING OUT THE INVENTION

Figure 1:
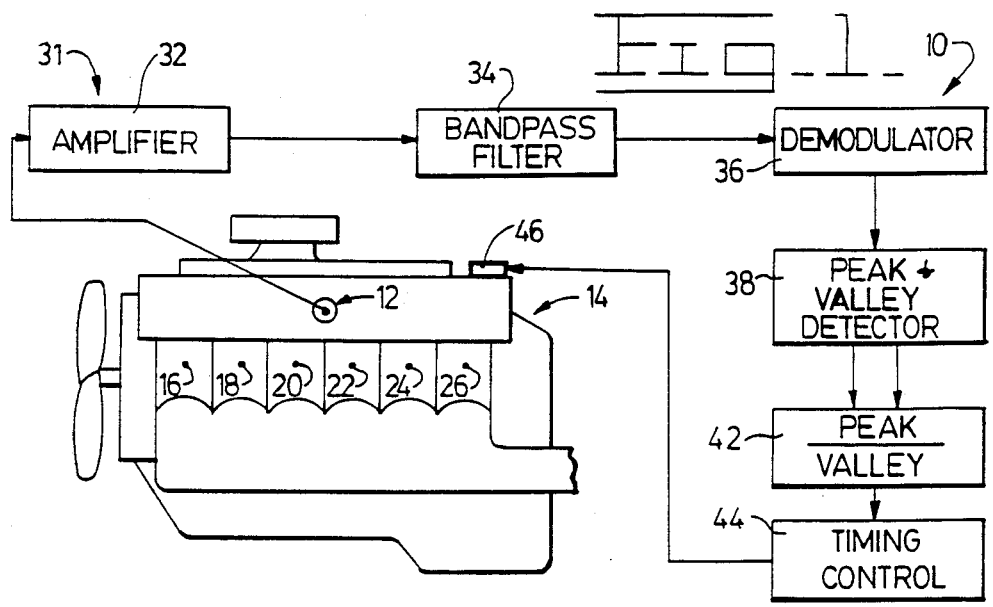
FIG. 1 is a block diagram of a preferred embodiment of the detonation measuring apparatus.

In the drawings there is shown an apparatus 10 for measuring the magnitude of knock in an internal combustion engine, such as a diesel engine 14. Knock is commonly understood to as an explosive detonation or autoignition of end gas in a combustion chamber which produces a metallic sound. A method for measuring the magnitude of knock includes transmitting a signal responsive to vibrations of the engine 14. The transmitted signal is filtered in a frequency band about a cavity resonance frequency of a combustion chamber of the engine 14. The filtered signal is demodulated to produce an envelope of the filtered signal. Maximums and minimums of each envelope are detected. A ratio of each maximum to each respective minimum is determined. The ratio is correlative to the magnitude of engine knock. This method is set forth generally with respect to FIGS. 1 and 2, and more particularly with respect to FIGS. 3, 4, 5, and 6.

FIG. 1 shows a vibration sensor, such as an accelerometer 12, mounted on engine 14. The engine 14 is an internal combustion engine having at least one combustion chamber 16,18,20,22,24, and 26. The accelerometer 12 is of a kind commercially available and is tuned to sense vibrations in a range about a cavity resonance frequency of at least one combustion chamber.

Those skilled in the art will recognize that cavities resonate at certain frequencies. Knock produces acoustic vibrations in the combustion chamber which excite the engine structure at the frequencies of cavity resonances. The resonances in a combustion chamber are determined by the following equation.

$$f = cf/D \quad \text{(Eqn. 1)}$$

f is frequency in hertz;
c is the speed of sound;
f is a non-dimensional number; and
D is the combustion chamber diameter.

This equation shows that the cavity resonant frequency f varies directly with the speed of sound and inversely with the diameter D. The speed of sound changes with the temperature of the combustion chamber, which rises as engine load increases. Therefore, the cavity resonant frequency f changes during engine operation. Preferably the first mode cavity resonance frequency is sensed to obtain an indication of engine knock. Therefore, the accelerometer 12 senses vibrations corresponding to a cavity resonance frequency A, including resonance frequency fluctuations during engine operation.

FIG. 2 shows a typical knock induced signal. A carrier wave 28 is amplitude modulated by the level of detonation. The carrier wave 28 is demodulated to create an envelope 30 which, as illustrated in FIG. 2, has a maximum value at A and a minimum value at B occurring during a preselected time indicated as t. The length of time t preferably includes several firings of the cylinders in one bank of the engine. While time t has been shown as including only one detonation, there could be several detonations in a severe case. The envelope 30 varies in amplitude and contains information concerning engine knock. The accelerometer 12 transmits this type of signal to a channel 31, which includes an amplifier 32, a bandpass filter 34, a demodulator 36, and a peak and valley detector 38, all shown in FIG. 1. The amplifier 32, the bandpass filter 34, the demodulator 36, and the peak and valley detector 38 are all of known design and function to those skilled in the art. Accordingly the detailed circuitry of these components is not discussed at length herein. The amplifier 32 receives the vibration signal from the accelerometer 12. The amplifier 32 amplifies and buffers the vibration signal, and delivers an amplified signal to a bandpass filter 34. The bandpass filter 34 filters the amplified signal, and passes only signals having frequencies within a range about the chosen mode of the cavity resonance frequency f. Typically, engine experiments determine the range of fluctuation of a cavity resonance frequency during the operation cycle of the engine. For instance, the first cavity resonance frequency for a large engine may be 4 K Hz using equation 1. As operating temperatures and loads vary, the cavity resonance frequency may vacillate from 2.5K Hz to 5.5K Hz. Therefore, the bandpass filter 34 should pass a frequency band from 2.5K Hz to 5.5K Hz to insure knock detection throughout the engine's operating cycle.

The filtered signal is passed to a demodulator 36, which detects the envelope 30 of the carrier wave 28. The envelope 30 varies in amplitude in response to knock, hence the waveform of the envelope 30 is a good indicator of the magnitude of engine knock. The envelope 30 is a knock signal which passes to a peak and valley detector 38.

The peak and valley detector 38 detects the maximum magnitude A and the minimum magnitude B of the envelope. When detonation occurs the accelerometer 12 produces a voltage signal having a magnitude responsive to the magnitude of the detonation. However, since the output from the accelerometer will vary from sensor to sensor, the maximum and minimum values will vary. Comparing the maximum of each time sample to the minimum of each time sample produces a more accurate indication of the magnitude of the detonation. This comparison effectively compares the peak detonation signal with background noise, thus eliminating the effect of the variation of the output of the sensor.

Therefore, a means 42 determines the ratio of the maximum magnitude of the envelope to the minimum magnitude of the envelope. This determination may be made in several ways, such as with a divider circuit or software, as described with respect to FIG. 5. The ratio of each maximum A to each respective minimum B is correlative to the magnitude of knock. The ratio minimizes sensor errors due to drift or calibration. The ratio may then be used as part of a timing control 44 to adjust the timing of the engine, via a magneto 46 for instance, in response to the magnitude of knock, as described with respect to FIG. 6.

Figure 3:
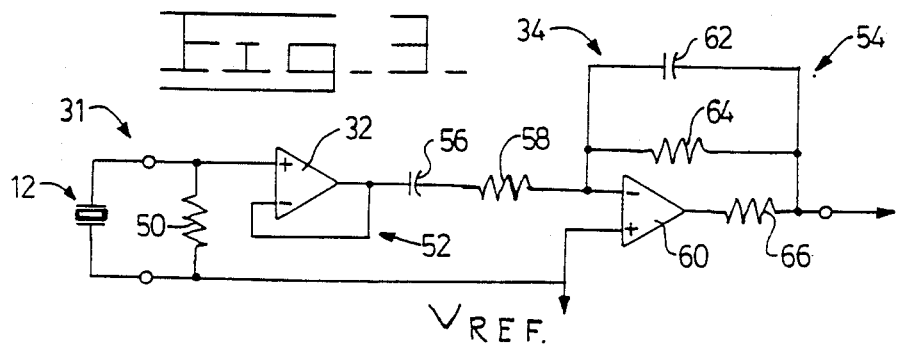
FIG. 3, on sheet 1 of the drawings, is a circuit diagram of a portion of the preferred embodiment of the detonation measuring apparatus.
Figure 4:
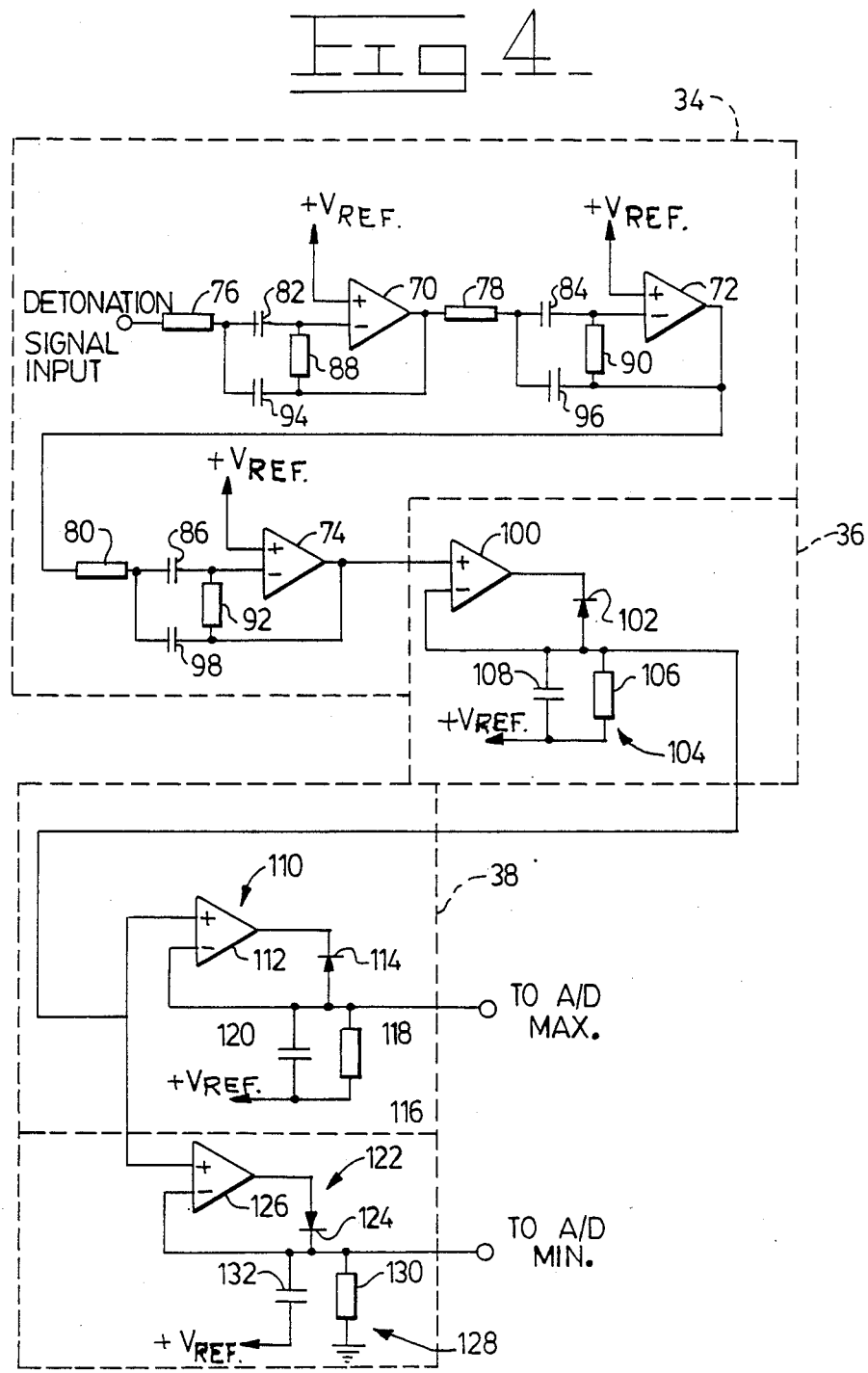
FIG. 4 is a circuit diagram of another portion of the preferred embodiment.

Refer now to FIGS. 3 and 4 which show a circuit diagram of a preferred embodiment of the detonation measuring apparatus. The subsequently described embodiment represents a particular design choice. Those skilled in the art recognize that there are various embodiments which fall within the scope of the present invention. As shown in FIGS. 3 and 4, the circuitry forms a channel 31. It will be appreciated that a vibration sensor is preferably connected to each cylinder bank of a multicylinder engine in order to accurately detect knock in all cylinders. For instance, an in-line six cylinder engine uses one vibration sensor, while a V-8 uses two vibration sensors. Therefore, each vibration sensor uses a similar channel 31. FIGS. 3 and 4 illustrate the apparatus having one channel, but several channels may be used if needed.

An accelerometer 12 is connected across a parallel resistor 50 to the input of an amplifier 32, shown here to be connected as a buffering amplifier 52. The output of the amplifier 32 is connected to the input of the first stage 54 of a bandpass filter 34.

The first stage 54 includes a serially connected capacitor 56 and resistor 58 at the negative input of an operational amplifier 60. A capacitor 62 in parallel with a resistor 64 are disposed in the negative feedback loop of the operational amplifier 60, and a resistor 66 is connected at the output of the operational amplifier 60. The positive input of the operational amplifier 60 is connected to a reference voltage, vref. The second stage 68 of the bandpass filter 34 is shown in FIG. 4 as a three-pole filter. The filter includes three operational amplifiers 70,72,74 connected in series. The positive input of each operational amplifier 70,72,74 is connected to the reference voltage, vref. A resistor 76,78,80 in series with a respective capacitor 82,84,86 are connected to the negative input of each respective operational amplifier 70,72,74. Furthermore, each operational amplifier 70,72,74 has a resistor 88,90,92 connected across the negative feedback loop, and a capacitor 94,96,98 connected across the negative feedback loop and across the capacitor 82,84,86. The output of the bandpass filter 34 is connected to the input of a demodulator 36.

The demodulator 36 receives the filtered signal and detects the envelope 30 of the carrier wave 28. The demodulator 36 includes an operational amplifier 100 having a diode 102 connected across the negative feedback loop. The output of the operational amplifier 100 is the anode of the diode 102. An RC filter 104 having a resistor 106 and a capacitor 108 receives the output of the operational amplifier 100. The diode 102 clips the incoming filtered signal so that only the portion above zero volts passes to the RC filter 104. As can be seen in FIG. 2, the upper envelope is a mirror image of the lower envelope, thus the required detonation information may be obtained by processing either the upper or lower envelope. The RC filter 104 filters out the frequency of the carrier wave 28 leaving the frequency of the envelope 30 which is the detonation signal. The output of the demodulator 36 is connected to the input of the peak and valley detector 38.

The peak and valley detector 38 detects the maximum magnitude and the minimum magnitude of the envelope. The peak detector 110 is quite similar in structure to the demodulator 36 described above. The peak detector 110 includes an operational amplifier 112 having a diode 114 connected across the negative feedback loop. The output of the operational amplifier 112 is the anode of the diode 114. An RC filter 116 having a resistor 118 and a capacitor 120 receives the output of the operational amplifier 112. In the peak detector 110 the RC filter is selected to have a quick discharge time and a slow charge time in order to detect the peak quickly and hold it. The valley detector 122 is also quite similar in structure to the peak detector 110 and the demodulator 36. However, the diode 124 of the valley detector 122 is biased oppositely as compared to the peak detector 110, so the output of the operational amplifier 126 of the valley detector 122 is the cathode of the diode 124. The diode is biased oppositely to detect the negative portion of the envelope. Again, the RC filter 128 at the output of the operational amplifier 126 is selected to have a quick charge time and a slow decay time in order to detect the valley quickly and hold it. Notice that in the demodulator 36 and in the peak detector 110, the resistors 106,118 and the capacitors 108,120 of the RC filters 104,116 are connected on one terminal to the output of the respective operational amplifiers 100,112 and are connected on the other terminal to the reference voltage, vref. In the valley detector 122, the resistor 130 is connected on one terminal to the output of the operational amplifier 126 and on the other terminal to circuit ground to provide a decay path for the valley detector, while the capacitor 132 is connected on one terminal to the output of the operational amplifier 126 and on the other terminal to the reference voltage, vref. In the preferred embodiment, outputs of the peak and valley detector 38 are passed through an analog-to-digital converter (A/D) for application to a microprocessor, not shown.

The microprocessor contains software, depicted in FIGS. 5 and 6, which determines the ratio of the peak signal to the valley signal, relates the ratio to the magnitude of knock, and controls the timing of the engine in response to the magnitude of knock.

FIG. 5 is a flowchart 150 depicting a portion of software of a preferred embodiment of the detonation measuring apparatus. As stated above, the software controls an associated microprocessor The microprocessor reads the data from the peak and valley detector 38. In fact the microprocessor is capable of reading from several different channels 31, and the flowchart 150 depicts a situation employing two channels 31,31, The software begins in a decision block 152, where the engine's acceleration is determined. Under rapid acceleration, the detonation ratio is set to zero in a block 154 and the loop ends. This is done to prevent false detection of knock due to engine vibrations in the knock frequency band which may occur during acceleration. Otherwise, control passes to a decision block 156 where the engine speed is determined. At low engine speeds, the detonation ratio is again set to zero in the block 154 and the loop ends. Since no detonation occurs at low speeds, the ratio is not monitored to prevent false detonation signals from external sources. Otherwise, control passes to a block 158 and the microprocessor reads the data from the peak detectors 110,110,40. Control passes to a block 160 and the microprocessor saves the peak values from each peak detector 110,110′ under the variable names MAX1 and MAX2, respectively. Control then passes to a block 162 and the microprocessor reads the data from the valley detectors 122,122′. Control passes to a block 164 and the microprocessor filters the valley signals with a low-pass filter having a time constant of 2.56 sec, for instance, which provides better sensitivity to detonation. The microprocessor then saves the valley values from each valley detector 122,122′ under the variable names BKGND1 and BKGND2, respectively. Control passes to a block 166 where the ratio of MAX1 to BKGND1 is determined, and teen to a block 168 where the ratio of MAX2 to BKGND2 is determined. These two ratios are compared one with another in a block 170 to determine a peak detonation ratio. The peak detonation ratio is the maximum of the two ratios, and is used in the timing control 44 to adjust the timing of the engine.

FIG. 6 is a flowchart 174 depicting another portion of software of a preferred embodiment of the detonation measuring apparatus. The software controls the associated microprocessor to effect the timing control 44 function for the engine 14. The inputs to this portion of the software are consecutive peak detonation ratios derived in the previously described software. The peak detonation ratios are compared to various preselected setpoints to determine the magnitude of detonation. In a decision block 176 the peak detonation ratio is compared to a first preselected setpoint X which, for the illustrated engine is "16". If the peak detonation ratio is less than the first preselected setpoint X. control passes to a block 178 where a signal is delivered to advance the timing of the engine 14. Since the engine is not experiencing detonation, the timing is advanced for the purpose of attaining optimum efficiency. Otherwise control passes to a decision block 180 where the peak detonation ratio is compared to a second preselected setpoint Y which, for the illustrated engine is "18". If the peak detonation ratio is less than the second preselected setpoint Y, control passes to a block 182 where a flag is set which denotes that the engine is in a state of best combustion, and the loop ends with no change in the timing of the engine. Otherwise control passes to a decision block 184 where the peak detonation ratio is compared to a third preselected setpoint Z which, for the illustrated engine is "22". If the peak detonation ratio is less than the third preselected setpoint Z, control passes to a block 186 where a signal is delivered which retards the timing of the engine. Since the engine is experiencing light detonation, the timing is retarded in order to attain optimum efficiency. Otherwise control passes to a decision block 191 where the peak detonation ratio is compared to a fourth preselected setpoint Z', which, for the illustrated engine, is "44". If the peak detonation ratio is less than the fourth preselected setpoint Z', control passes to a block 188 where a flag is set which denotes that the engine is in a state of heavy detonation, and the loop ends. After a delay to allow the engine to respond to the retarded timing (e.g. five seconds), if the engine remains in heavy detonation for a predetermined period of time, 100 milliseconds for instance, the retarding is not eliminating the detonation, so a signal is delivered to shut down the engine. During the delay time it is important that the engine be protected against severe detonation, that is a detonation level equal to or greater than a fourth setpoint Z', which is higher than the third setpoint A. If the peak detonation level is equal to or greater than the fourth preselected setpoint Z', control is passed to block 190 where a signal is delivered to immediately shutdown the engine.

Industrial Applicability

Internal combustion engines experience a phenomenon called knock. Knock is a noise which occurs due to improper ignition of fuel in a combustion chamber. Poor timing, low fuel octane, and unsatisfactory fuel mixture all cause improper ignition. At times knock may be severe enough to cause engine damage. The apparatus 10 functions to accurately measure knock, and to control the timing of the engine in response to the magnitude of knock to maintain optimum combustion efficiency. An accelerometer 12 delivers vibration signals to an amplifier 32. The vibration signals generally have detonation signals modulated by a carrier frequency which corresponds to the cavity resonance frequency of the cylinder. The amplified signals pass to a bandpass filter 34 which passes portions of the amplified signal having frequency components within a range about the acoustic cavity resonance frequency. A demodulator 36 detects the envelope of the filtered signal, since the envelope contains the detonation signal. In order to eliminate sensor inaccuracies and background noise effects, a peak and valley detector 38 detects the maximum and minimum of each detonation signal. In the preferred embodiment, the detected maximum and minimum of each detonation signal passes through an A/D converter to a microprocessor. The microprocessor determines the ratio of each maximum to each respective minimum, and produces a peak detonation signal. The peak detonation signal is then compared to a series of preselected setpoints to determine the magnitude of detonation. If the magnitude of detonation indicates a state of optimum combustion, the timing control 44 portion of the software does not effect a change in engine timing. However, if the magnitude does not indicate a state of optimum combustion, the engine timing is advanced or retarded by a predetermined number of degrees in an attempt to achieve optimum combustion. As the software reexecutes every loop, the magnitude of detonation is sampled and the timing controlled in response thereto. After a predetermined number of occurrences of the peak detonation ratio having a magnitude indicating heavy detonation the microprocessor delivers an engine shutdown signal. Preferably a relay for controlling fuel delivery to the engine 14 is responsive to the engine shutdown signal. Upon reception of the engine shutdown signal, fuel delivery to the engine halts and the engine stops, thus preventing possible damage to the engine due to knock.

Other aspects, objects, and advantages of this invention can be obtained from a study of the drawings, the disclosure, and the appended claims.

We claim:

1. A method of measuring the magnitude of knock in an internal combustion engine having at least one combustion chamber, comprising the steps of:
    transmitting a signal responsive to vibrations of the engine;
    filtering said transmitted signal in a frequency band about a cavity resonance frequency of a combustion chamber of the engine;
    demodulating said filtered signal to produce an envelope of said filtered signal;
    detecting the maximum and minimum of the envelope during a first period of time; and
    determining a ratio of each maximum to each respective minimum, said ratio being correlative to the magnitude of knock.

2. A method of measuring the magnitude of knock in an internal combustion engine as set forth in claim 1, further comprising the step of:
    during a second period of time greater than the first period of time, counting occurrences of said ratio which have (a) a magnitude less than a first preselected value, (b) a magnitude equal to said first preselected value, and (c) a magnitude greater than said first preselected value.

3. A method of measuring the magnitude of knock in an internal combustion engine as set forth in claim 2, wherein said first preselected value is correlative to an acceptable magnitude of knock.

4. A method of measuring the magnitude of knock in an internal combustion engine as set forth in claim 1, further comprising the step of:
  advancing engine timing by a predetermined number of degrees in response to said ratio having a magnitude less than a first preselected value.

5. A method of measuring the magnitude of knock in an internal combustion engine as set forth in claim 2, further comprising the step of:
  retarding engine timing by a predetermined number of degrees in response to a counted number of occurrences of said ratio having a magnitude greater than a second preselected value greater than the first preselected value.

6. A method of measuring the magnitude of knock in an internal combustion engine as set forth in claim 5, further comprising the step of:
  disabling operation of the engine in response to a continuing number of occurrences of said ratio having a magnitude greater than a third preselected value which is greater than the second preselected value.

7. A method of measuring the magnitude of knock in an internal combustion engine as set forth in claim 6, in which the step of disabling operation of the engine is performed subsequent to retarding engine timing and in a third period of time greater than the second period of time.

8. A method of measuring the magnitude of knock in an internal combustion engine as set forth in claim 5, further comprising the step of:
  disabling operation of the engine in response to said ratio having a magnitude at least equal to a fourth preselected value which is greater than the third preselected value.

9. A method of measuring the magnitude of knock in an internal combustion engine as set forth in claim 1, further comprising the steps of:
  counting occurrences of said ratio having a magnitude less than a first preselected value;
  counting occurrences of said ratio having a magnitude less than a second preselected value and equal to or greater than said first preselected value; and
  counting occurrences of said ratio having a magnitude less than a third preselected value and equal to or greater than said second preselected value.

10. A method of measuring the magnitude of knock in an internal combustion engine as set forth in claim 9, further comprising the step of:
  advancing engine timing by a predetermined number of degrees in response to a predetermined number of occurrences of said ratio having a magnitude less than said first preselected value.

11. A method of measuring the magnitude of knock in an internal combustion engine as set forth in claim 9, further comprising the step of:
  retarding engine timing by a predetermined number of degrees in response to a predetermined number of occurrences of said ratio having a magnitude equal to or greater than said second preselected value.

12. A method of measuring the magnitude of knock in an internal combustion engine as set forth in claim 7, further comprising the step of:
  disabling operation of the engine in response to a continuing number of occurrences of said ratio having a magnitude equal to or greater than said third preselected value subsequent to retarding engine timing.

13. A method of measuring the magnitude of knock in an internal combustion engine as set forth in claim 12, in which the step of disabling operation of the engine is performed in response to the number of occurrences being in a period of time greater than that in which the ratio is established.

14. A method of measuring the magnitude of knock in an internal combustion engine as set forth in claim 9, including the step of determining occurrences of said ratio having a magnitude equal to or greater than said third preselected value.

15. A method of measuring the magnitude of knock in an internal combustion engine as set forth in claim 14, including the step of disabling operation of the engine in response to any occurrence of said ratio having a magnitude equal to or greater than said third preselected value.

16. An apparatus for measuring the magnitude of knock in an internal combustion engine having a plurality of combustion chambers, comprising:
  an accelerometer mounted on a bank of the combustion chambers and arranged to deliver an electrical signal responsive to vibrations of the engine;
  a filter for receiving the electrical signal and tuned to pass frequencies of said electrical signal in a band about a cavity resonance frequency of said combustion chambers;
  a demodulator for detecting the envelope of the filtered electrical signal;
  means for detecting the maximum and minimum magnitudes of the envelope in a preselected period of time; and
  means for determining the ratio of each maximum to each respective minimum, said ratio being correlative to the magnitude of knock.

17. An apparatus as set forth in claim 16, further comprising:
  means for counting occurrences of said ratio having a magnitude less than a preselected value.

18. An apparatus as set forth in claim 17, wherein said preselected value is correlative to an acceptable magnitude of knock.

19. An apparatus as set forth in claim 17, further comprising:
  means for advancing engine timing by a predetermined number of degrees in response to a predetermined number of occurrences of said ratio having a magnitude less than said preselected value.

20. An apparatus as set forth in claim 17, further comprising:
  means for retarding engine timing by a predetermined number of degrees in response to a predetermined number of occurrences of said ratio having a magnitude greater than a second preselected value greater than the preselected value.

21. An apparatus as set forth in claim 16, further comprising:
  means for counting occurrences of said ratio having a magnitude less than a first preselected value;
  means for counting occurrences of said ratio having a magnitude less than a second preselected value which is greater than said first preselected value;
  means for counting occurrences of said ratio having a magnitude less than a third preselected value which is greater than said second preselected value; and means for counting occurrences of said ratio having a magnitude less than a fourth preselected value which is greater than said third preselected value.

22. An apparatus as set forth in claim 21, further comprising:

means for advancing engine timing by a predetermined number of degrees in response to a predetermined number of occurrences of said ratio having a magnitude less than said first preselected value.

23. An apparatus as set forth in claim 21, further comprising:

means for retarding engine timing by a predetermined number of degrees in response to a predetermined number of occurrences of said ratio having a magnitude greater than said second preselected value.

24. An apparatus as set forth in claim 21, further comprising:

means for disabling operation of the engine in response to a continuing number of occurrences of said ratio having a magnitude greater than said third preselected magnitude subsequent to retarding engine timing.

25. An apparatus as set forth in claim 21, including means for disabling operation of the engine in response to any occurrence of said ratio having a magnitude equal to or greater than said fourth preselected value.

* * * * *